United States Patent [19]

Lomas

[11] Patent Number: 4,885,138
[45] Date of Patent: Dec. 5, 1989

[54] DUAL FUNCTION HEAT WITHDRAWAL APPARATUS

[75] Inventor: David A. Lomas, Arlington Heights, Ill.

[73] Assignee: UOP, Des Plaines, Ill.

[21] Appl. No.: 89,708

[22] Filed: Aug. 26, 1987

Related U.S. Application Data

[62] Division of Ser. No. 18,265, Feb. 24, 1987, Pat. No. 4,757,039.

[51] Int. Cl.⁴ .............................................. F27B 15/16
[52] U.S. Cl. .................................... 422/144; 422/145; 422/146; 165/104.16
[58] Field of Search .... 422/144, 145, 146, 165/104.16

[56] References Cited

U.S. PATENT DOCUMENTS

| | | | |
|---|---|---|---|
| 4,424,192 | 1/1984 | Lomas et al. | 422/109 |
| 4,425,301 | 1/1984 | Vickers et al. | 422/111 |
| 4,438,071 | 3/1984 | Vickers et al. | 422/109 |
| 4,483,276 | 11/1984 | Lomas et al. | 122/4 D |
| 4,698,212 | 10/1987 | Walters et al. | 422/144 |

Primary Examiner—Barry S. Richman
Assistant Examiner—D. John Griffith, Jr.
Attorney, Agent, or Firm—Thomas K. McBride; John G. Tolomei

[57] ABSTRACT

A process and apparatus for cooling FCC catalyst that provides two modes of operation for a remote heat exchanger type cooler. In the first mode the exchanger is operated in a backmix fashion where catalyst is circulated between the cooler and a disengagement zone. Regenerated catalyst is withdrawn from an outlet located close to the heat exchanger inlet so that essentially all of the heat removed by the cooler serves to reduce the temperature of catalyst entering the reaction zone. This mode of operation is particularly useful in obtaining a benefit from the cooler when processing light to moderate FCC feeds. In the second mode, the exchanger is operated in a flow through mode where hot catalyst is withdrawn from the disengaging zone cooled in the exchanger and passed into the combustion zone. The second mode of operation is used to withdraw heat from the overall regeneration process in the case of heavy FC feedstock conversion.

5 Claims, 2 Drawing Sheets

DUAL FUNCTION HEAT WITHDRAWAL APPARATUS

CROSS REFERENCE TO RELATED APPLICATION

This application is a divisional application of prior copending application Ser. No. 018,265, filed Feb. 24, 1987, now U.S. Pat. No. 4,757,039, issued July 12, 1988.

BACKGROUND OF THE INVENTION

The field of art to which this invention pertains is fluid particle cooling. It particularly relates to the combustion of combustible material from a particulated solid such as fluidizable catalyst which has been at least partially deactivated by the deposition thereon of a combustible material, such as coke. The present invention will be most useful in a process for regenerating coke-contaminated fluid cracking catalyst, but it should find use in any process in which combustible material is burned from solid, fluidizable particles.

DESCRIPTION OF THE PRIOR ART

The fluid catalyst cracking process (hereinafter FCC) has been extensively relied upon for the conversion of starting materials, such as vacuum gas oils, and other relatively heavy oils, into lighter and more valuable products. FCC involves the contact in a reaction zone of the starting material, whether it be vacuum gas oil or another oil, with a finely divided, or particulated, solid, catalytic material which behaves as a fluid when mixed with a gas or vapor. This material possesses the ability to catalyze the cracking reaction, and in so acting it is surface-deposited with coke, a by-product of the cracking reaction. Coke is comprised of hydrogen, carbon and other material such as sulfur, and it interferes with the catalytic activity of FCC catalysts. Facilities for the removal of coke from FCC catalyst, so-called regeneration facilities or regenerators, are ordinarily provided within an FCC unit. Coke-contaminated catalyst enters the regenerator and is contacted with an oxygen containing gas at conditions such that the coke is oxidized and a considerable amount of heat is released. A portion of this heat escapes the regenerator with the flue gas, comprised of excess regeneration gas and the gaseous products of coke oxidation. The balance of the heat leaves the regenerator with the regenerated, or relatively coke free, catalyst.

The fluidized catalyst is continuously circulated from the reaction zone to the regeneration zone and then again to the reaction zone. The fluid catalyst, as well as providing catalytic action, acts as a vehicle for the transfer of heat from zone to zone. Catalyst exiting the reaction zone is spoken of as being "spent", that is partially deactivated by the deposition of coke upon the catalyst. Catalyst from which coke has been substantially removed is spoken of as "regenerated catalyst".

The rate of conversion of the feedstock within the reaction zone is controlled by regulation of the temperature, activity of catalyst and quantity of catalyst (i.e. catalyst to oil ratio) therein. The most common method of regulating the reaction temperature is by regulating the rate of circulation of catalyst from the regeneration zone to the reaction zone which simultaneously increases the catalyst/oil ratio. That is to say, if it is desired to increase the conversion rate, an increase in the rate of flow of circulating fluid catalyst from the regenerator to the reactor is effected. Inasmuch as the temperature within the regeneration zone under normal operations is considerably higher than the temperature within the reaction zone, this increase in influx of catalyst from the hotter regeneration zone to the cooler reaction zone effects an increase in reaction zone temperature.

Previous politico-economic restraints which were put upon the traditional lies of supply of crude oil made necessary the use, as starting materials in FCC units, of heavier-than-normal oils. Thus, great emphasis was put on the ability of FCC units to cope with feedstocks such as residual oils and possibly mixtures of heavy oils with coal or shale derived feeds.

Recent downward pricing of crude oil supplies have, at least temporarily, blunted the drive for processing increasingly heavier feeds in FCC units. Instead the prevailing uncertainty in available feedstock composition makes it advantageous to have an FCC unit that can handle a wide variety of feeds.

The chemical nature and molecular structure of the feed to the FCC unit will affect that level of coke on spent catalyst. Generally speaking, the higher the molecular weight, the higher the Conradson carbon, the higher the heptane insolubles, and the higher the carbon to hydrogen ratio, the higher will be the coke level on the spent catalyst. Also, high levels of combined nitrogen, such as found in shale derived oils, will also increase the coke level on spent catalyst. The processing of heavier and heavier feedstocks, and particularly the processing of deasphalted oils, or direct processing of atmospheric bottoms from a crude unit, commonly referred to as reduced crude, does cause an increase in all or some of these factors and does therefore cause an increase in coke level on spent catalyst.

This increase in coke on spent catalyst results in a larger amount of coke burned in the regenerator per pound of catalyst circulated. Heat is removed from the regenerator in conventional FCC units in the flue gas and principally in the hot regenerated catalyst stream. An increase in the level of coke on spent catalyst will increase the temperature difference between the reactor and the regenerator, and in the regenerated catalyst temperature. A reduction in the amount of catalyst circulated is therefore necessary in order to maintain the same reactor temperature. However, this lower catalyst circulation rate required by the higher temperature difference between the reactor and the regenerator will result in a fall in conversion, making it necessary to operate with a higher reactor temperature in order to maintain conversion at the desired level. This will cause a change in yield structure due to an increase in thermal versus catalytic selectivity which may or may not be desirable, depending on what products are required from the process. Also there are limitations to the temperatures that can be tolerated by FCC catalyst without there being a substantial detrimental effect on catalyst activity. Generally, with commonly available modern FCC catalyst, temperatures of regenerated catalyst are usually maintained below 1400° F., since loss of activity would be very severe at about 1400°-1450° F. If a relatively common reduced crude such as that derived from Light Arabian crude oil were charged to a conventional FCC unit, and operated at a temperature required for high conversion to lighter products, i.e. similar to that for a gas oil charge, the regenerator temperature would operate in the range of 1600°-1800° F. This would be too high a temperature for the catalyst, require very expensive materials of construction, and give an extremely low catalyst circulation rate. It is therefore accepted that when materials are processed that would give excessive regenerator temperatures, a means must be provided for removing heat from the regenerator, which enables a lower regenerator temperature, and a lower temperature difference between the reactor and the regenerator.

The prior art is replete with disclosures of FCC processes which utilize dense or dilute phase regenerated fluid catalyst heat removal zones or heat exchangers that are remote from and external to the regenerator vessel to cool hot regenerated catalyst for return to the regenerator. Examples of such disclosures are as set forth in Daviduk et al. U.S. Pat. No. 4,238,631; Harper U.S. Pat. No. 2,970,117; Owens U.S. Pat. No. 2,873,175; McKinney U.S. Pat. No. 2,862,798; Watson et al. U.S. Pat. No. 2,596,748; Jahnig et al. U.S. Pat. No. 2,515,156; Berger U.S. Pat. No. 2,492,948; Watson U.S. Pat. No. 2,506,123; Lomas U.S. Pat. No. 4,396,531; Lomas et al. U.S. Pat. No. 4,353,812; and Lomas et al. U.S. Pat. No. 4,439,533. At least one of the above U.S. patents (Harper) discloses that the rate of return of the cooled catalyst to the regenerator may be controlled by the regenerator (dense catalyst phase) temperature.

An important consideration in the above FCC processes involving regenerator heat removal is the method of control of the quantity of heat removed. In Harper U.S. Pat. No. 2,970,117 and Huff U.S. Pat. No. 2,463,623, the sole method involves regulation of the rate of flow of regenerated catalyst through external catalyst coolers. This method of heat removal, utilizing external coolers and varying the rate of catalyst circulation through them as the exclusive means of control of the heat exchanger duty, involves the continual substantial changing of the catalyst loading on the regenerator with the associated difficulty or impossibility of maintaining convenient steady state operations. An improved method of remote cooler, heat removal is disclosed in Lomas et al. U.S. Pat. No. 4,353,812 where the heat transfer coefficient across the heat transfer surface is controlled by varying the catalyst density through regulation of fluidizing gas addition. The principle of controlling heat removal with fluidizing gas addition is used in Lomas U.S. Pat. No. 4,439,533 to operate a backmixed cooling zone where catalyst to be cooled circulates in and out of a cooler inlet opening without a net transport of catalyst through the cooler. One method of control that has been purposefully avoided in the operation of most heat removal zones is the circulation rate of cooling medium. Consequently, in order to prevent overheating and possible failure of the cooling tubes, cooling medium circulates through the tubes at a high and constant rate.

Although the various cooler designs will remove heat from the FCC process, none of these cooler designs provide the flexibility for advantageous use in processing a wide range of FCC feeds. The present invention allows an external type heat removal zone to be used advantageously for processing light to heavy FCC feedstocks.

SUMMARY OF THE INVENTION

Accordingly, the invention is, in one embodiment, a process for the cooling of hot fluidized solid particles contained in a first dense phase fluidized bed of the particles. The hot particles are circulated from the first bed through a cooler inlet to a cooling zone separate from the first bed and in open communication therewith. As long as heat removal requirements remain relatively low, the cooling zone operates in a backmix mode wherein the hot particles are continuously backmixed between the cooling zone and the first bed and heat is withdrawn from the hot particles by indirect heat exchange with a cooling fluid enclosed in a heat exchange means inserted into the cooling zone to produce relatively cool particles. The particles are maintained in the cooling zone as a second dense phase fluidized bed by passing a fluidizing gas upwardly through the second bed. The first and second beds comprise a continuum throughout which the particles are continuously circulated. Fluidized solid particles are removed from the first bed for use outside the process through a withdrawal point comprising an upper outlet located proximate the cooler inlet. In this way, a blend of particles having a temperature intermediate the temperature of the uncooled particles in the first bed and cooled particles in the cooling zone are removed from the first bed. When heat removal requirements for the first bed increase, the cooling zone is operated in a flow through mode wherein hot particles are transported from the first bed through the cooler inlet and passed downwardly through the cooling zone while yet maintaining a second dense phase in the cooling zone. Passing the particles downwardly through the cooling zone increases the total particle circulation rate, and can thereby increase the heat withdrawal from the cooling zone. Downward movement also draws particles away from the cooler inlet and hinders circulation of particles from the cooler inlet to the withdrawal point. Accordingly, the invention lies, at least in part, in providing a cooling zone having one mode for primarily cooling particles removed from the first bed and a second mode for cooling particles removed from the bottom of the cooling zone.

Whether operating in a flow or backmix mode, the quantity of heat removed is influenced by the heat transfer coefficient between the catalyst and the heat exchange means, and the differential temperature between the catalyst and the cooling fluid. The heat transfer coefficient rises as the quantity of fluidizing medium increases. Thus, heat removal is controlled, at least in part, by varying the quantity of fluidizing gas. The differential temperature is a function of catalyst circulation through the cooler. Consequently, variation in the catalyst circulation offers another method of controlling heat removal which can be utilized most directly in the flow through mode of cooler operation.

In a second embodiment, the invention is an apparatus for cooling hot fluidized particles, which apparatus comprises in combination: (a) hot particle collection chamber; (b) a shell and tube heat exchanger of vertical orientation, remote from the collection chamber, having the shell closed at the bottom and having the upper portion of the shell of the heat exchanger in sealed communication with an opening in the collection chamber such that particles can circulate to and from the collection chamber through the shell; (c) an outlet at a bottom portion of the shell of the heat exchanger for removing particles from the exchanger through a conduit connected thereto; (d) a valve for regulating flow through the conduit such that interrupting flow through the conduit allows operation of the exchanger in a complete backmix mode and opening the valve changes operation of the cooler to an at least partial flow through mode; (e) means for injecting and distributing fluidizing gas at a bottom portion of the shell side of the heat exchanger, such that fluidizing gas can pass into the shell side and maintain a continuously fluidized particle bed therein and regulating the flow of fluidizing gas into the heat exchanger thereby regulating the heat transfer coefficient between the outside surface of the tubes of the heat exchanger and the fluidized particle bed, and thereby regulating the duty; (f) inlet and outlet conduits connected to the tubes of the heat exchanger, such that a cooling fluid can flow through the tubes; (g) a withdrawal point comprising an outlet in the collection chamber, proximate the heat exchanger opening, for removing particles from the collection chamber.

A highly preferred embodiment of this invention uses the cooling process of this invention in the regeneration of catalyst particles for an FCC operation. In this embodiment, an oxygen containing regeneration gas and coke-contaminated fluidized catalyst enter the lower locus of a combustion zone maintained at a sufficient temperature for coke oxidation. Hot flue gas from the combustion zone transports hot regenerated catalyst into a disengaging zone wherein the flue gas is separated and withdrawn. Hot catalyst collects at the bottom as a fluidized bed in the bottom of the disengaging zone. The disengaging zone has a withdrawal point at its lower locus for removing catalyst from the bed for use in an FCC reaction zone. A cooling zone, of the type previously described, has an inlet in communication with the fluidized bed and located proximate the withdrawal point. This cooling zone may again be operated, according to this invention, in either the backmix mode or flow through mode. The ability to operate in either the flow through or backmix mode allows burn kinetics to be maintained and cooler utilization to continue when processing light or heavy feedstocks. When processing a heavy feed in the FCC reaction zone, the relatively large amount of coke produced will require high heat withdrawal and an overall reduction of catalyst temperatures throughout the regenerated zone. In this situation, the cooler operates in a flow through mode to maximize heat withdrawal and circulate cooled catalyst to the combustion zone so that overall catalyst temperatures are kept below about 1300° F. Thus, in the heavy feed processing case, catalyst withdrawn from the disengaging zone has about the same temperature as catalyst in the regenerator. If a relatively light FCC feedstock becomes available, a relatively lower amount of coke is produced in the regeneration zone and the cooler is not needed to keep catalyst temperatures throughout the regeneration below 1300° F. However, in certain circumstances, it would be advantageous to reduce the temperature of catalyst entering the reaction zone from the catalyst withdrawal point—temperatures on the order of 1250° F. being particularly preferred. Using the cooler in a flow through mode to reduce the temperature of the catalyst at the withdrawal point would lower catalyst temperatures throughout the regeneration zone thereby interfering with the burn kinetics for coke combustion which favor a higher temperature. However, using the cooler in the backmix mode only reduces catalyst temperatures near the catalyst withdrawal point so that overall the regenerator still operates at temperatures favorable for burn kinetics and coke combustion while relatively cooler catalyst is withdrawn for use in the reaction zone. Although a single function cooler, receiving catalyst from the withdrawal point and charging cooled catalyst to the reaction zone, could be used to lower the temperature of catalyst entering the reaction zone, such a cooler would depress the catalyst temperature too severely when called on to meet the heat removal demands of heavy feed processing. In addition, such a single function cooler could not be isolated from catalyst flow in the event of mechanical failure.

Other embodiments of the present invention encompass further details such as process streams and the function and arrangement of various components of the apparatus, all of which are hereinafter disclosed in the following discussion of each of these facets of the invention.

Figure 1:
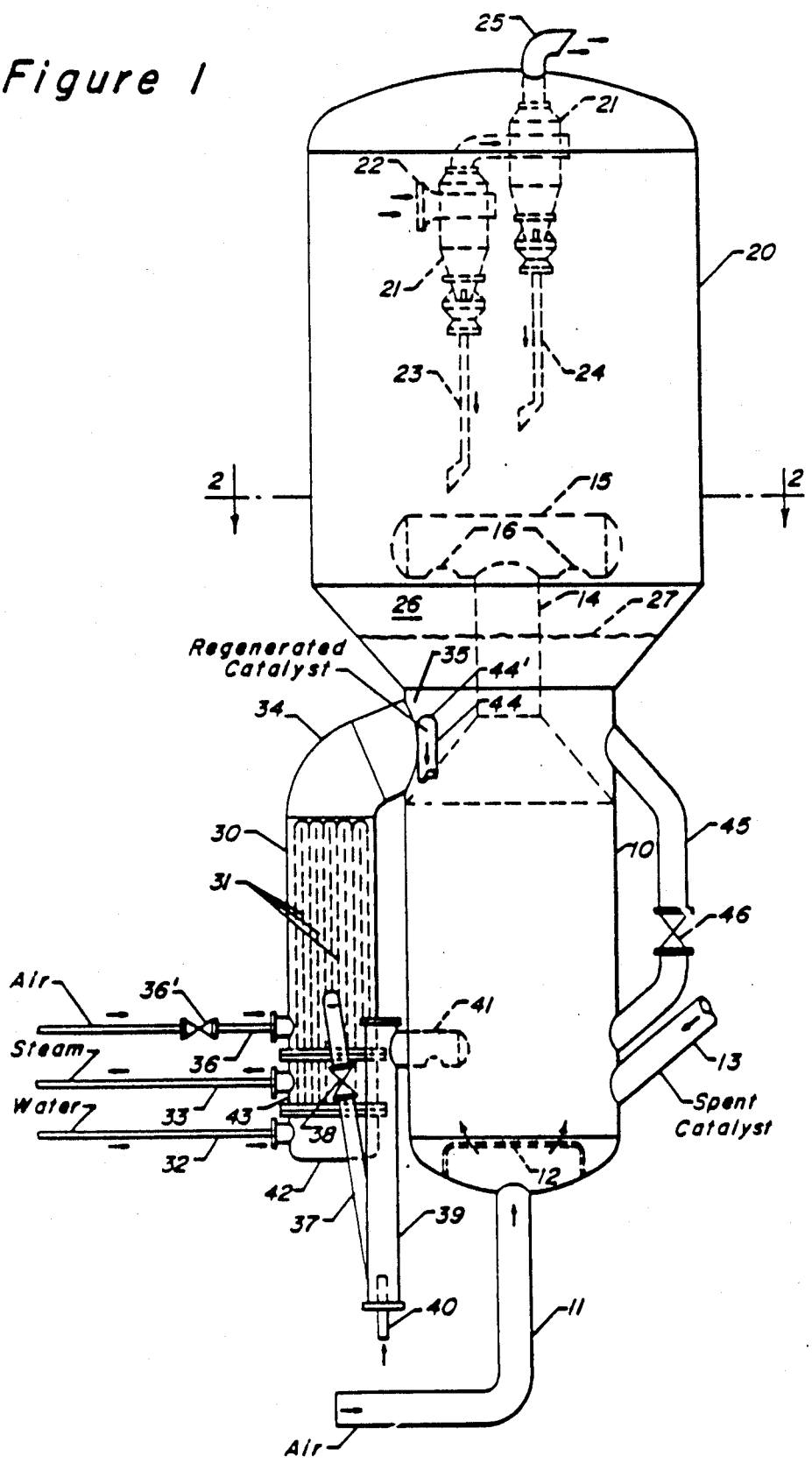
FIG. 1 is a sectional, elevation view of a regeneration apparatus according to one embodiment of the present invention, showing a combustion zone 10, a disengagement zone 20, and a cooling zone (heat exchanger) 30.

The above-described drawings are intended to be schematically illustrative of the present invention and not be a limitation thereon.

DETAILED DESCRIPTION OF THE INVENTION

The present invention, in its process aspects, consists of steps for the cooling of a fluidized particulate solid. An important application of the invention will be for a process for the combustion of a combustible material from fluidized solid particles containing the combustible material, including the step of introducing oxygen containing combustion gas and the fluidized solid particles into a combustion zone maintained at a temperature sufficient for oxidation of the combustible material. The combustible material will be oxidized therein to produce the first dense phase fluidized bed of hot fluidized solid particles cooled by the process of the invention.

The above combustion zone may be in dilute phase with the hot particles transported to a disengaging zone wherein the hot particles are collected and maintained as the first bed, or the combustion zone may be in dense phase and in itself comprise the first bed.

In a particularly important embodiment of the invention, there will be included steps for the regenerative combustion within a combustion zone of a coke containing FCC catalyst from a reaction zone to form hot flue gas and hot regenerated catalyst, disengagement and collection of the hot regenerated catalyst, cooling of the hot regenerated catalyst in a heat removal or cooling zone, and the use of at least a portion of the cooled regenerated catalyst for control of the temperatures of the catalyst returning to the reaction zone. As used herein, the term "hot regenerated catalyst" means regenerated catalyst at the temperature leaving the combustion zone, from about 1300° to about 1400° F., while the term "cool regenerated catalyst" means regenerated catalyst at the temperature leaving the cooling zone, the latter of which is up to 200° F. less than the temperature of the hot regenerated catalyst. When heat removal requirements from the regenerative combustion stage are low, as will occur when processing more traditional FCC feeds such as vacuum gas oils, the cooling zone is operated in a backmix zone wherein the hot regenerated catalyst is continuously circulated through the combustion zone with no net downward movement of catalyst through the cooling zone. As the coke making tendencies of the feedstock increase with a shift toward processing the previously mentioned heavier than normal oils, the cooling zone is operated in a flow through mode so that cool catalyst passes directly into the combustion zone to effect an overall temperature reduction throughout the combustion zone and disengagement zone. In the backmix mode there will be a temperature gradient at the bottom of the disengagement zone, with the coolest catalyst being proximate to the opening to the cooling zone and the hottest catalyst being at the portion of the bottom of the disengagement zone furthest from such opening. By removing catalyst for the reaction zone from the disengagement zone at a point proximate the cooler opening, essentially all of the heat removed from the cooler lowers only the temperature of catalyst returning to the reaction zone.

Reference will now be made to the attached drawings for a discussion of examples of the regeneration process embodiment and associated apparatus of the invention. In FIG. 1, regeneration gas, which may be air or another oxygen-containing gas, enters the combustion zone 10 through a line 11, and is distributed by a dome style distribution grid 12. Air leaving the grid mixes with coke contaminated catalyst entering the combustion zone through a conduit 13. These streams are shown as flowing separately into the combustor zone 10, however each stream could flow together into a mixing conduit before entering combustion zone 10. Coke contaminated catalyst commonly contains from about 0.1 to about 5 wt. % carbon, as coke. Coke is predominantly comprised of carbon, however, it can contain from about 5 to about 15 wt. % hydrogen, as well as sulfur and other materials. The regeneration gas and entrained catalyst flows upward from the lower part of combustion zone 1 to the upper part thereof in dilute phase. The term "dilute phase", as used herein, shall mean a catalyst/gas mixture of less than 30 lbs/ft$^3$, and "dense phase" shall mean such mixture equal to or more than 30 lbs/ft$^3$. Dilute phase conditions, that is, a catalyst/gas mixture of less than 30 lbs/ft$^3$, and typically 2–10 lbs/ft$^3$, are the most efficient for coke oxidation. As the catalyst/gas mixture ascends within combustion zone 10, the heat of combustion of coke is liberated and absorbed by the now relatively carbon-free catalyst, in other words by the regenerated catalyst.

The rising catalyst/gas stream flows through riser conduit 14 and impinges upon the top of lateral conduit 15, which impingement changes the direction of flow of the stream and directs the catalyst and gas mixture through outlets 16. The impingement of the catalyst/gas stream upon surface 15 and the change of direction through outlets 16 causes almost all of the hot regenerated catalyst flowing from the combustion zone to disengage from the flue gas and fall to the bottom portion of disengagement zone 20 which comprises a hot particle collection chamber or fluid particle collection section. Although zone 20 is referred to as a disengaging zone, this term also embraces the possibility that additional regeneration or combustion may be carried out in this zone. The catalyst collection area of the disengagement zone may be an annular receptacle, as shown, or any other shape appropriate for collecting catalyst particles. Catalyst in the bottom of the collection zone is maintained as a dense fluidized bed 26 having an upper level 27. The gaseous products of coke oxidation and excess regeneration gas, or flue gas, and a small uncollected portion of hot regenerated catalyst flow up through disengagement zone 20 and enter catalyst/gas separators such as cyclones 21 through an inlet 22. Catalyst separated from the flue gas falls from the cyclones to the bottom of disengagement zone 20 through dip legs 23 and 24. The flue gas exits disengagement zone 20 via conduit 25, through which it may proceed to associated energy recovery systems.

With further reference to FIG. 1, the cooling zone is comprised of a heat exchanger 30 having a vertical orientation with the catalyst in the shell side and the heat exchange medium, supplied by lines 32 and 33, passing through a tube bundle 31. The preferred heat exchange medium would be water, which, in further preference, would change only partially from liquid to gas phase (steam) when passing through the tubes. It is also preferable to operate the heat exchanger so that the exchange medium is circulated through the tubes at a constant rate. The tube bundle in the heat exchanger will preferably be of the "bayonet" type wherein one end of the bundle is unattached, thereby minimizing problems due to the expansion and contraction of the heat exchanger components when exposed to and cooled from the high regenerated catalyst temperatures. The heat transfer that occurs is, from the catalyst, through the tube walls, and into the heat transfer medium. The top of the shell is in sealed communication with the bottom portion of the disengagement zone through a conduit portion 34 and an inlet 35 which serves as a withdrawal point. Fluidizing gas, preferably air, is passed into a lower portion of the shell side of heat exchanger 30 via line 36, thereby maintaining a dense phase fluidized catalyst bed in the shell side. The line 36 has valve 36' positioned across line 36 to regulate the flow of fluidizing gas. The fluidizing gas effects turbulent backmixing and flow to and from the disengagement zone when the exchanger is in a backmix mode and allows catalyst transport when the exchanger is in a flow through mode. The level of the dense phase catalyst bed in the disengagement zone will be kept above the opening into the shell so that the catalyst, when operating in the backmix mode, may freely backmix and circulate throughout the inside of the shell and the bottom of the disengagement zone.

When operating in the flow through mode, cool catalyst is withdrawn from a lower portion of cooling zone 30 and returned to the combustion zone 10. Catalyst is withdrawn from a lower portion of the cooling through a conduit 37 having a flow control valve 38. Valve 38 regulates catalyst flow out of conduit 37 and is fully closed when operating the exchanger in a complete backmixed mode. Upon opening valve 38, catalyst flows into an external riser 39. A fluidizing gas, preferably a small portion of the combustion gas entering the combustion zone via line 11, enters the bottom of riser 39 through pipe 40 and lifts catalyst from the bottom of riser 39 and transports the cool catalyst into combustion zone 10 through riser outlet 41.

FIG. 1 shows a preferred embodiment of heat exchanger 30 and the manner of the interconnection of heat exchanger 30 with disengagement zone 20. Heat exchanger 30 is shown with the shell side completely filled with a dense phase fluidized catalyst bed which extends up to level 27, level 27 being well above the connection between the heat exchanger and disengagement zone. Catalyst freely circulates and backmixes throughout the heat exchanger shell and disengagement zone forming a dense phase continuum. Fluidizing gas, such as air, which enters the shell via line 36 (air may be introduced at one or more points in the shell in addition to that shown) rises upward and flows into the disengagement zone where it ultimately leaves the system with the flue gases.

The tube bundle shown is of the aforementioned bayonet type in which the tubes are attached at the bottom or "head" of the heat exchanger, but not at any other location. A typical configuration of tubes in the bayonet-type bundle would be one inch tubes each ascending from inlet manifold 42 in the head up into the shell through a three inch tube sealed at its top, each one inch tube emptying into the three inch tubes in which it is contained just below the sealed end of the three inch tube. A liquid, such as water, would be passed up into the one inch tubes, would empty into the three inch tubes, would adsorb heat from the hot catalyst through the wall of the three inch tubes as it passed downward through the annular space of the three inch tubes and would exit the heat exchanger, at least partially vaporized, from outlet manifold 43 in the head. It is essential that the quantity of hot particles or catalyst which enter heat exchanger 30 be sufficient to maintain a depth of dense phase fluid catalyst bed which substantially submerges the tubes in the dense phase bed.

A conduit removes regenerated catalyst from the disengaging zone and delivers it to an FCC reaction zone (not shown). The flow of hot catalyst into the disengagement zone will always exceed the hot catalyst exit flow requirements via conduit 44. At least a portion of catalyst not exiting via conduit 44 will be circulated to the combustion zone. Shown in FIG. 1 is an external conduit 45 and control valve 46 through which the catalyst may pass from the disengagement zone to the combustion zone.

Although FIG. 1 illustrates a single heat exchanger with associated circulating catalyst conduit, it should be understood that other configurations are possible, such as two heat exchangers, of the design illustrated, side by side with the conduit 45 between them.

The flow through mode of the exchanger is used to transfer cooled catalyst from the cooling zone to combustion zone. Cooled catalyst entering the combustion zone effects an overall temperature reduction throughout the combustion and disengagement zone. Therefore in the flow through mode a relatively uniform temperature exists in the disengagement zone and the temperature of the catalyst withdrawn from conduit 44 will approach the maximum combustion or regeneration zone temperature. Operational methods and benefits for a flow through type cooler, especially in processing heavy FCC feedstocks, are well known and can be found in the previously cited background patents, in particular U.S. Pat. No. 4,434,245. A disadvantage of this mode of operation is that the temperature of the catalyst leaving conduit 44 cannot be reduced without depressing temperatures throughout the combustion and disengagement zones.

Figure 2:
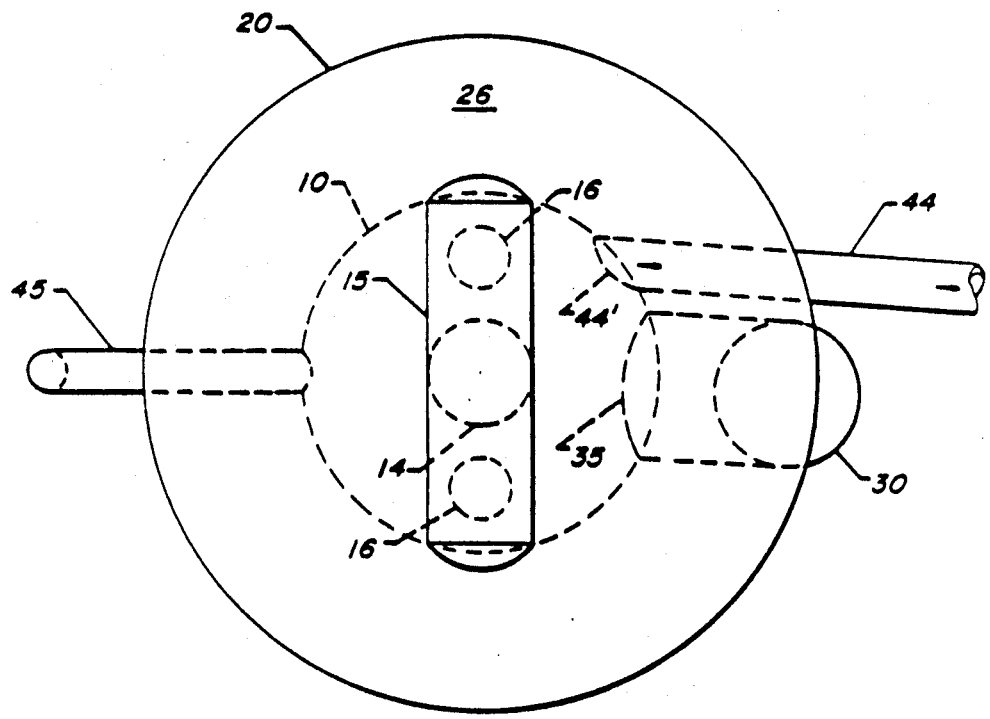
FIG. 2 is a plan view of the regeneration apparatus taken along line 2—2.

The backmix mode of cooling zone operation as practiced in this invention primarily reduces the temperature of catalyst removed from the disengaging zone by conduit 44. It is known that backmixing can be obtained within the heat exchanger at reasonable superficial gas velocities to circulate catalyst between the cooling zone and disengaging zone. The air affects the heat transfer coefficient directly by affecting the superficial velocity over the heat exchanger tubes and indirectly by influencing the extent of mass flow of catalyst from the disengagement zone through the heat exchanger. The higher mass flow will also result in a higher heat exchanger duty because the average catalyst temperature in the heat exchanger will be higher thereby providing a higher temperature difference ($\Delta T$) to which the amount of heat transfer is directly proportional. Additional details on the operation of a backmix cooling zone can be found in U.S. Pat. No. 4,439,533. Relatively cool catalyst, circulated about the inlet of the cooling zone migrates to the outlet of conduit 44. Locating the cooling zone inlet 35 and the outlet 44' of conduit 44 in close proximity brings about this migration. FIG. 2 depicts the relative location of outlet 44' and inlet 35. Preferably, the outlet and inlet will be within a 120° sector of the disengaging periphery. Thus, as conduit 44 removes catalyst from the disengaging section, it draws catalyst away from the opening 35 and encourages the flow of hot catalyst particles across the catalyst opening 35. The outlet for conduit 45 has a location generally opposite the outlet 44' and inlet 35 in order to prevent the migration of cooled catalyst toward conduit 45 and ultimately into the combustion zone. Normally the backmix mode of cooling will be practiced until temperatures in the regeneration section begin to exceed 1300° F.

FIG. 2 also shows a preferred orientation for outlet openings 16 where, in plan, the openings lie between the outlet of conduit 45, and inlet-outlet pair 35 and 44. Due to the disengaging effect of lateral conduit 15, most of the hot catalyst transferred to the disengaging zone from the combustion zone will enter regions of bed 27 which are remote from inlet 35, outlet 44' and any region therebetween. Therefore with this arrangement, a substantial portion of the catalyst removed by conduit 44 must first flow past cooling zone inlet 35, thereby facilitating the withdrawal of relatively cooler catalyst from opening 44'. This arrangement also allows catalyst entering the disengagement zone to enter conduit 45 without flowing past opening 35 so that cooled catalyst does not enter the combustor through conduit 45. Where catalyst is dropped into the disengaging zone by a device having more than two outlets, the outlets should be located to minimize hot catalyst addition to the region of catalyst bed 26 that supplies catalyst to outlet 44' and inlet 35.

In a highly preferred embodiment, the cooling zone operates in a backmix mode when an FCC reaction zone, associated therewith, processes a light to moderately heavy FCC feed. Significant yield advantages for selected products can be obtained by lowering the temperature of catalyst and raising the temperature of the feed entering the reaction zone. As hereinbefore described, backmix operation of the cooling zone will selectively reduce the temperature of removed catalyst. This reduction occurs without a direct affect on overall regenerator temperatures. Of course, considered alone, heat removal from the catalyst entering the reaction zone would ultimately lead to lower overall temperatures in the combustion and disengaging zones. However, in this preferred form of operation, additional heat associated with the higher temperature feed offset the reduced heat input from the catalyst so that the temperature regime of the combustion and disengaging zones remains unaffected. Thus, favorable reaction kinetics are maintained in the combustion zone by a cooling zone that also has the capability to effect an overall reduction of combustion and disengaging zone temperatures when desired.

The following example demonstrates the advantages of using the cooling zone to reduce the temperature of catalyst entering the reaction zone when processing a moderately heavy FCC feed. The feed in this example is a blend of vacuum gas oil and residual oil having the properties set forth in Table 1.

TABLE 1

| API | 23.8 |
|---|---|
| S Wt. % | 1.38 |
| RAMS BOTTOM CARBON Wt. % | 1.9 |
| Ni/V Wt. - PPM | 1 |
| VOL - % 1050° F. | 18 |

EXAMPLE I

In this example the FCC feed was processed in an FCC reactor-regenerator having an FCC riser reaction zone at process conditions summarized in Table 2. This example did not include the use of a cooler, therefore, the no entry is shown across from the cooler duty item. Yield results for this operation are also summarized in Table 2.

TABLE 2

PROCESS APPLICATION FEEDSTOCK-PRODUCT FLEXIBILITY

| PROCESS CONDITIONS | EXAMPLE I | EXAMPLE II |
|---|---|---|
| CATALYST TO COMBUSTOR TEMP ° F. | 980 | 980 |
| CATALYST TO REACTOR TEMP ° F. | 1396 | 1355 |
| CAT/OIL | BASE | BASE |
| FEED TEMP. °F. | 350 | 510 |
| COOLER DUTY BTU/LB COKE | — | 1940 |
| MAT ACTIVITY | BASE | BASE +3 |
| CAT ADDN #/BBL | 0.27 | 0.27 |
| YIELDS | | |
| C$_2$-Wt. % | 5.1 | 4.3 |
| C$_3$ LV. % | 10.1 | 10.4 |
| C$_4$ LV. % | 13.5 | 13.9 |
| C$_5$ -GASOLINE LV. % | 52.9 | 54.9 |
| LCO LV. % | 16.5 | 15.9 |
| CO LV. % | 11.8 | 11.0 |
| COKE Wt. % | 5.5 | 5.5 |
| TOTAL LV. % | 104.7 | 106.6 |

EXAMPLE II

In this example, the same feed was processed in an FCC reactor regenerator identical in all respects to that of Example I except for the addition of a cooling zone arranged in accordance with this invention. Process conditions and yield results for this example are again summarized in Table 2. A comparison of the conditions shows that the only major differences, apart from the cooler duty, were, for Example II, a lower temperature for the catalyst entering the riser and a higher temperature for the feed to the riser.

The yield results for the two examples demonstrate the benefits of the cooler operation, at constant coke production, in the increased liquid volume yields of gasoline which accompanied an overall gain in total liquid volume yields. Thus, the gain in liquid volume yields is made with a selectivity toward gasoline.

It should be emphasized, however, that the FCC embodiment illustrated by the Figures and the examples is only one possible application of the present invention which in its broadest sense is a process for cooling any hot fluidized particles for any purpose. The apparatus aspect of the present invention in its broadest sense, as summarized above, may also be identified in the Figures. Thus, the bottom of disengagement zone 20 comprises the hot particle collection chamber or fluid particle collection section. Heat exchanger 30 is the shell and tube heat exchanger of vertical orientation. Conduit 37, its attachment to exchanger 30 and riser 39 provide the outlet and conduit for removing particles from the exchanger. Valve 38 provides the valve for regulating flow through the conduit line 37. Lines 32 and 33 are the cooling fluid inlet and outlet conduits.

What is claimed is:

1. Apparatus for regenerating a coke contaminated, fluid catalyst which apparatus comprises in combination:
   (a) a vertically oriented combustion chamber;
   (b) a disengagement chamber located superadjacent to and above said combustion chamber and in communication therewith;
   (c) a catalyst collection section at the bottom of said disengagement chamber;
   (d) a catalyst cooler comprising a shell and tube heat exchanger of vertical orientation, remote from said combustion and disengagement chamber, having a catalyst inlet at an upper portion of the shell side of said heat exchanger and a catalyst outlet at a bottom portion of the shell side of said heat exchanger;
   (e) a catalyst cooler conduit connecting said catalyst collection section with said heat exchanger inlet, such that regenerated catalyst from said disengagement chamber can circulate to said catalyst cooler, said cooler conduit having an inlet in said collection space located within a 120° semi-circular sector of said disengagement chamber;
   (f) a cooled-catalyst conduit connecting said catalyst outlet of said heat exchanger with said combustion chamber, such that cooled catalyst can flow from said heat exchanger to said combustion chamber;
   (g) means for adding a variable amount of fluidizing gas to said catalyst cooler and maintaining a fluidized catalyst bed therein;
   (h) means for regulating catalyst flow through said cooled catalyst conduit; and
   (i) a regenerated catalyst conduit for withdrawing regenerated catalyst from the disengagement chamber said regenerated catalyst conduit having an inlet located in said collection space within said 120° semi-circular sector.

2. The apparatus of claim 1 wherein said cooled-catalyst conduit has a generally vertical portion and means for introducing lift gas into said portion to transport catalyst upwardly therein.

3. The apparatus of claim 1 wherein catalyst is communicated from said combustion chamber to said disengagement chamber through one or more outlets that impart a downward trajectory to the catalyst and each outlet is located such that its trajectory does not lie within a sector containing the inlets of said regenerated catalyst conduit and said heat exchanger.

4. The apparatus of claim 1 wherein said heat exchanger comprises a series of bayonet tubes, cooling medium passes through the tube side of said exchanger, and catalyst passes through the shell side of said exchanger.

5. The apparatus of claim 4 wherein the axial distance along said catalyst cooler conduit between said tubes and said heat exchanger inlet is less than twice the inside diameter of said cooler.

* * * * *